(12) United States Patent
Lee et al.

(10) Patent No.: US 11,480,975 B2
(45) Date of Patent: Oct. 25, 2022

(54) METHOD OF ADAPTIVELY OPERATING BASED ON HEIGHT DIFFERENCE BETWEEN FLOORS AND CLEANING ROBOT

(71) Applicant: LG ELECTRONICS INC., Seoul (KR)

(72) Inventors: Changhyeon Lee, Seoul (KR); Woo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

(21) Appl. No.: 16/765,405

(22) PCT Filed: Sep. 20, 2019

(86) PCT No.: PCT/KR2019/012256
§ 371 (c)(1),
(2) Date: May 19, 2020

(87) PCT Pub. No.: WO2020/071669
PCT Pub. Date: Apr. 9, 2020

(65) Prior Publication Data
US 2020/0333799 A1    Oct. 22, 2020

(30) Foreign Application Priority Data
Oct. 2, 2018  (KR) .................. 10-2018-0117798

(51) Int. Cl.
*G05D 1/02* (2020.01)
*A47L 9/04* (2006.01)
*A47L 9/28* (2006.01)

(52) U.S. Cl.
CPC .......... *G05D 1/0274* (2013.01); *A47L 9/0494* (2013.01); *A47L 9/2826* (2013.01);
(Continued)

(58) Field of Classification Search
CPC .. G05D 1/0274; G05D 1/0212; G05D 1/0242; G05D 1/0246; G05D 2201/0203;
(Continued)

(56) References Cited

U.S. PATENT DOCUMENTS 7,237,298 B2 *   7/2007   Reindle ................. A47L 9/2842
                                              15/340.1
8,649,557 B2 *   2/2014   Hyung ................... G06T 7/277
                                              382/153
(Continued)

FOREIGN PATENT DOCUMENTS

KR         10-0517942 B1      9/2005
KR      10-2012-0055891 A     6/2012
(Continued)

*Primary Examiner* — Bhavesh V Amin
(74) *Attorney, Agent, or Firm* — Birch Stewart Kolasch & Birch, LLP

(57) ABSTRACT

A method for adaptively operating a cleaning robot based on height difference between floors and the cleaning robot are provided, and according to an embodiment of the present disclosure, the cleaning robot that adaptively operates based on the height difference between the floors includes a central controller that controls a height adjuster that controls a height of a floor cleaner based on height information related to a space stored in a map storage and height information sensed by a sensor.

16 Claims, 11 Drawing Sheets

(52) U.S. Cl.
CPC ........... *A47L 9/2831* (2013.01); *A47L 9/2852* (2013.01); *G05D 1/0212* (2013.01); *G05D 1/0242* (2013.01); *G05D 1/0246* (2013.01); *A47L 2201/04* (2013.01); *G05D 2201/0203* (2013.01); *G05D 2201/0215* (2013.01)

(58) Field of Classification Search
CPC ........... G05D 2201/0215; A47L 9/0494; A47L 9/2826; A47L 9/2831; A47L 9/2852; A47L 2201/04; A47L 2201/06; A47L 9/066; A47L 9/0666; A47L 9/2847; A47L 9/04; B25J 9/16; B25J 11/00; B25J 11/0085; B25J 9/1664; B25J 9/1674; B25J 9/1679
See application file for complete search history.

(56) References Cited

U.S. PATENT DOCUMENTS

| | | | | |
|---|---|---|---|---|
| 9,474,427 | B2* | 10/2016 | Lee | A47L 11/4061 |
| 9,480,380 | B2* | 11/2016 | Yoo | A47L 11/4061 |
| 10,265,859 | B2* | 4/2019 | Deyle | B25J 9/1694 |
| 10,384,351 | B2* | 8/2019 | Deyle | G05D 1/0094 |
| 10,414,052 | B2* | 9/2019 | Deyle | B25J 11/008 |
| 10,437,342 | B2* | 10/2019 | Brunner | G06T 7/50 |
| 10,478,973 | B2* | 11/2019 | Deyle | B25J 13/086 |
| 10,486,313 | B2* | 11/2019 | Deyle | G08B 13/196 |
| 11,182,625 | B2* | 11/2021 | Lee | G06V 20/64 |
| 2005/0065662 | A1* | 3/2005 | Reindle | A47L 9/2889 701/1 |
| 2005/0278888 | A1* | 12/2005 | Reindle | A47L 9/2857 15/319 |
| 2006/0085095 | A1 | 4/2006 | Reindle et al. | |
| 2007/0282484 | A1* | 12/2007 | Chung | G05D 1/0238 700/245 |
| 2010/0058546 | A1 | 3/2010 | Erlich | |
| 2012/0125363 | A1 | 5/2012 | Kim et al. | |
| 2013/0030659 | A1 | 1/2013 | Porat et al. | |
| 2013/0274924 | A1* | 10/2013 | Chung | G05D 1/0274 700/259 |
| 2015/0150429 | A1* | 6/2015 | Yoo | A47L 11/4011 173/4 |
| 2015/0265125 | A1* | 9/2015 | Lee | A47L 11/4066 701/26 |
| 2016/0142508 | A1* | 5/2016 | Ishihara | H04L 43/0811 370/236 |
| 2017/0225321 | A1* | 8/2017 | Deyle | G06K 7/10297 |
| 2017/0225332 | A1* | 8/2017 | Deyle | G05D 1/0094 |
| 2017/0225334 | A1* | 8/2017 | Deyle | G05D 1/0094 |
| 2017/0225336 | A1* | 8/2017 | Deyle | B25J 9/1664 |
| 2018/0157328 | A1* | 6/2018 | Brunner | G06T 7/50 |
| 2018/0189565 | A1* | 7/2018 | Lukierski | G06T 7/74 |
| 2018/0210448 | A1* | 7/2018 | Lee | G05D 1/0274 |
| 2018/0213987 | A1 | 8/2018 | Hong et al. | |
| 2018/0239355 | A1* | 8/2018 | Lee | G08G 1/166 |
| 2018/0246518 | A1* | 8/2018 | Vogel | G05D 1/0225 |
| 2018/0255997 | A1* | 9/2018 | So | B25J 9/1664 |
| 2018/0275677 | A1* | 9/2018 | Hamada | G05D 1/0246 |
| 2019/0193276 | A1* | 6/2019 | Deyle | B25J 13/006 |
| 2019/0329421 | A1* | 10/2019 | Deyle | B25J 5/007 |
| 2020/0039081 | A1* | 2/2020 | Deyle | B25J 11/002 |
| 2020/0089970 | A1* | 3/2020 | Lee | G05D 1/0231 |

FOREIGN PATENT DOCUMENTS

| | | |
|---|---|---|
| KR | 10-2013-0107642 A | 10/2013 |
| KR | 10-2018-0142508 A | 12/2016 |
| KR | 10-2017-0033579 A | 3/2017 |

* cited by examiner

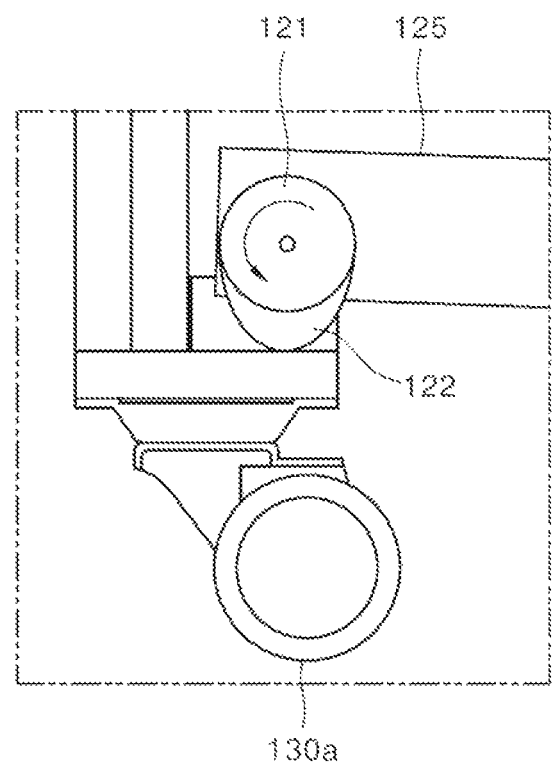

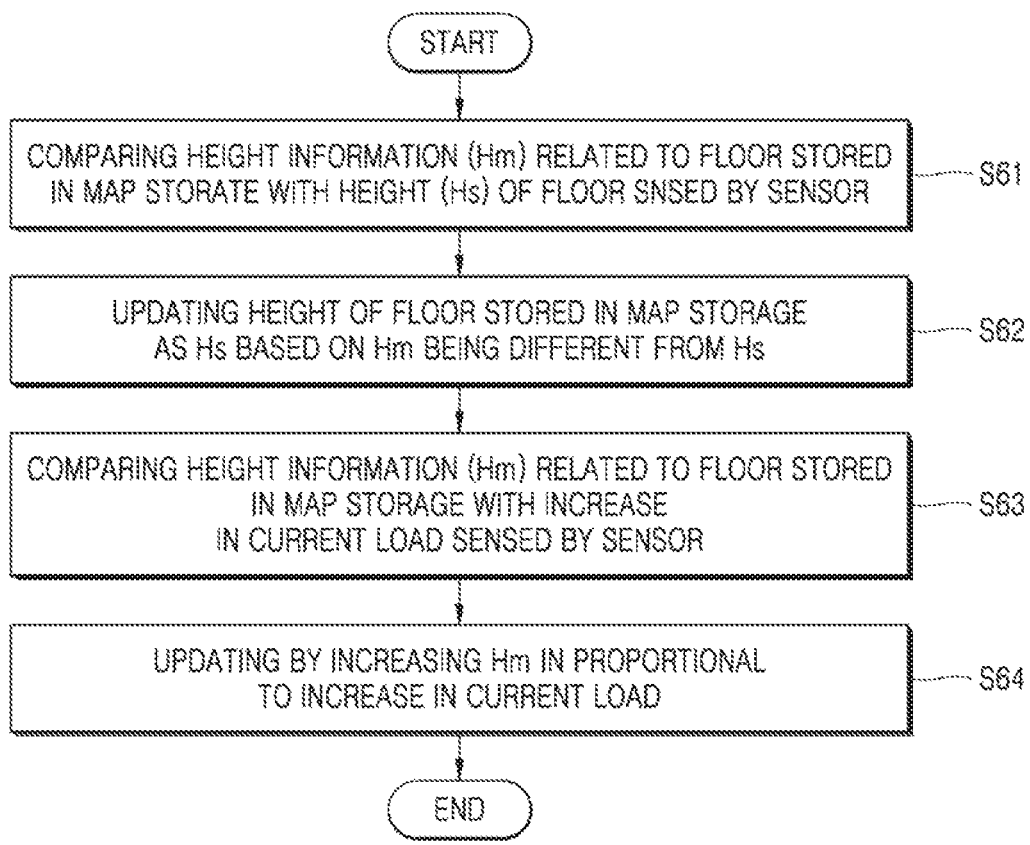

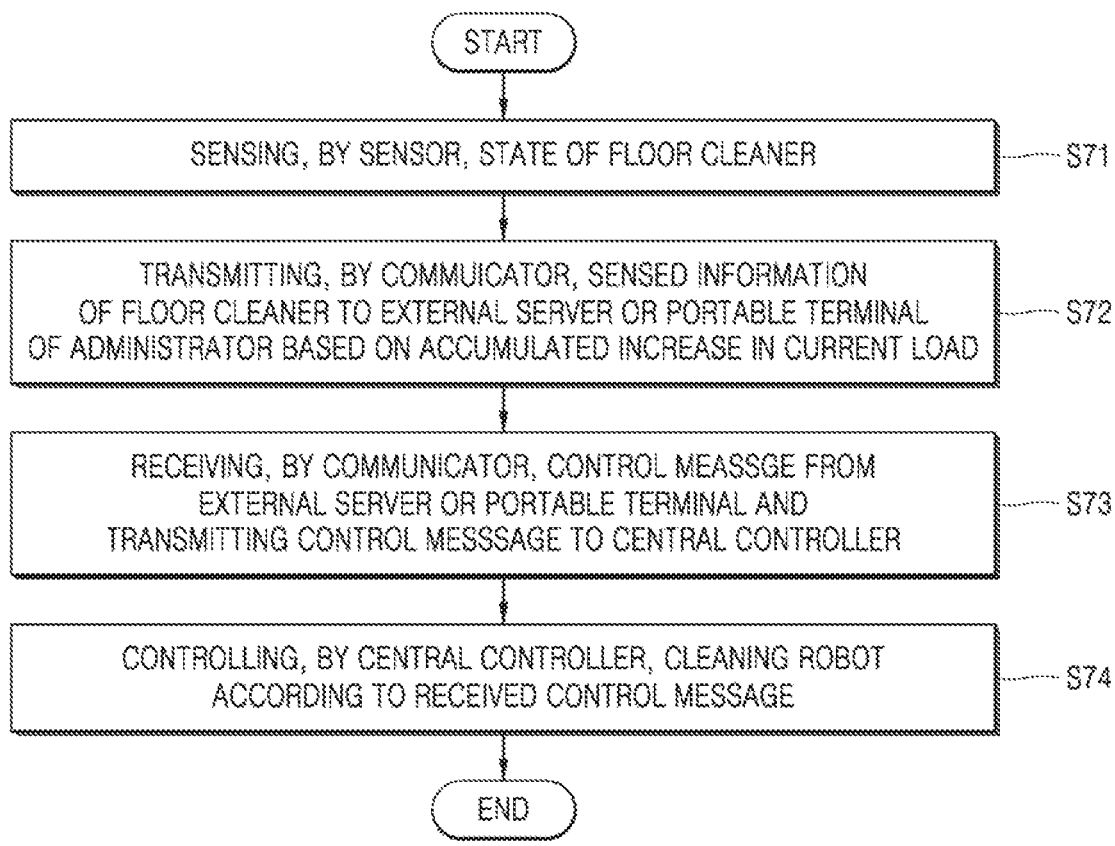

METHOD OF ADAPTIVELY OPERATING BASED ON HEIGHT DIFFERENCE BETWEEN FLOORS AND CLEANING ROBOT

CROSS-REFERENCE TO RELATED APPLICATIONS

This application is the National Phase of PCT International Application No. PCT/KR2019/012256, filed on Sep. 20, 2019, which claims priority under 35 U.S.C. 119(a) to Patent Application No. 10-2018-0117798, filed in the Republic of Korea on Oct. 2, 2018, all of which are hereby expressly incorporated by reference into the present application.

TECHNICAL FIELD

The present disclosure relates to a method for adaptively operating a cleaning robot based on a height difference between floors and the cleaning robot.

BACKGROUND ART

Different states may occur in various types of spaces, for example, spaces where human and material exchanges are actively performed such as airports, schools, government offices, hotels, offices, factories, and the like. For example, materials of the floor may vary in the case of the floor and an additional carpet may be disposed on the floor.

In particular, cleaning robots may include various types of structures for suctioning or brushing foreign matters disposed on the floor, and this structure may have a limit in operation due to height difference between the floors. Therefore, cleaning robots are required to change physical or operational properties of components thereof to respond to a special change situation of the floor (height difference and material difference).

Hereinafter, the present specification proposes an operation method to cope with different heights thereof during a process of moving a cleaning robot having mobility and a way for implementing components of an apparatus that performs the operation method.

DISCLOSURE

Technical Problem

In this specification, to solve the above-mentioned problem, the present disclosure controls components of a cleaning robot to adaptively operate based on changes in a height of the floor.

Further, in the present specification, height information related to a space where the cleaning robot moves is stored to clean based on properties of the floor when the clearing robot moves to the space.

Further, the present specification proposes a method for adaptively operating a cleaning robot in a situation of a change between previously stored height and the floor.

The objects of the present disclosure are not limited to the above-mentioned objects, and the other objects and advantages of the present disclosure, which are not mentioned, can be understood by the following description, and more clearly understood by the embodiments of the present disclosure. It will be also readily understood that the objects and the advantages of the present disclosure may be implemented by features described in appended claims and a combination thereof.

Technical Solution

According to an embodiment of the present disclosure, a cleaning robot that adaptively operates based on height difference between the floors may include a central controller which controls a height adjuster that adjusts a height of a floor cleaner based on height information related to a space, which is stored in a map storage and height information sensed by a sensor.

According to an embodiment of the present disclosure, a cleaning robot that adaptively operates based on a height difference between the floors includes a sensor and a central controller, the sensor senses a height of the floor of the space where the cleaning robot moves and senses materials of the floor of the moving of the cleaning robot, and the central controller determines height adjustment of a floor cleaner based on the height information related to the floor sensed by the sensor.

According to an embodiment of the present disclosure, a cleaning robot that adaptively operates based on the height difference between the floors includes the sensor and the central controller, the sensor senses load of a current applied to a motor of the floor cleaner, and the central controller determines the height adjustment of the floor cleaner based on load information related to the current sensed by the sensor.

According to an embodiment of the present disclosure, a method for adaptively operating based on the height difference between the floors includes extracting and identifying, by the central controller, height information related to the floor of the space where the cleaning robot moves from a map storage of the cleaning robot, and controlling, by the central controller, a height adjuster based on the identified information related to the floor.

According to an embodiment of the present disclosure, a method for adaptively operating based on the height difference between the floors includes sensing, by the sensor of the cleaning robot, the height of the floor of the space where the cleaning robot moves and controlling, by the central controller, a height adjuster based on the height information stored in the map storage and the height information sensed by the sensor.

Advantageous Effects

When embodiments of the present disclosure are applied, a cleaning robot may adaptively perform a cleaning function based on a height difference between a floor and the floor covered with materials like carpet.

When embodiments of the present disclosure are applied, information on the height of the space where the cleaning robot moves is previously stored to adjust a cleaning function based on properties of the floor, in particular, a height of the floor when the cleaning robot moves to the corresponding space.

Further, in the present specification, the cleaning robot may be adaptively operated based on a height corresponding to previously stored height information different from a height of the floor.

Effects of the present disclosure are not limited to the above-mentioned effects and the skilled person of the pres-

DESCRIPTION OF DRAWINGS

FIG. 8 shows a configuration of a height adjustor according to an embodiment of the present disclosure.

FIG. 10 shows a process of updating height information related to floor stored in a map storage according to an embodiment of the present disclosure.

FIG. 11 shows a process of transmitting, to outside, state information related to a floor cleaner sensed by a sensor according to an embodiment of the present disclosure.

DETAILED DESCRIPTIONS

Figure 1:
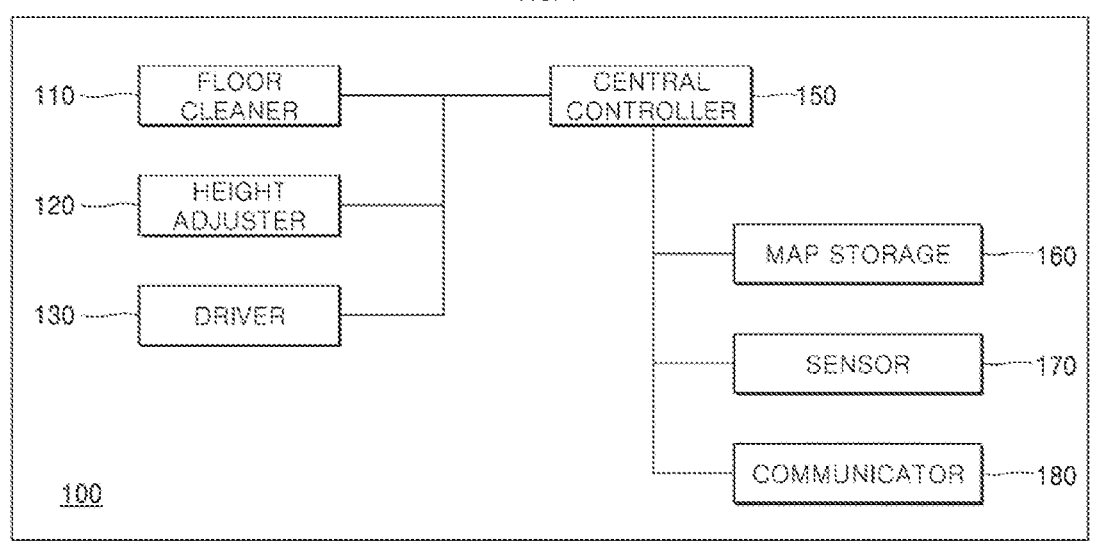
FIG. 1 shows a configuration of a cleaning robot according to an embodiment of the present disclosure.

Hereinafter, the embodiment of the present disclosure will be described in detail with reference to the drawings so that those skilled in the art to which the present disclosure pertains can easily perform the present disclosure. The present disclosure can be implemented in many different manners and is not limited to the embodiment described herein.

In order to clearly illustrate the present disclosure, a part that is not related to the description is omitted, and same or similar components are denoted by the same reference numerals throughout the specification. Further, some embodiments of the present disclosure will be described in detail with reference to exemplary drawings. In adding the reference numerals to the components of each drawing, the same components may have the same sign as possible even if they are displayed on different drawings. Further, in describing the present disclosure, when it is determined that a detailed description of a related known configuration and a function may obscure the gist of the present disclosure, the detailed description thereof will be omitted.

In describing components of the present disclosure, it is possible to use terms such as first, second, A, B, (a), (b), and the like. These terms are only intended to distinguish a component from another component, and a nature, an order, a sequence, or a number of the corresponding components are not limited by that term. When a component is described as being "connected", "coupled", or "connected" to another component, the component may be directly connected or also to be connected to other component, it is to be understood that an additional component is "interposed" between the two components, or the two components are "connected", "coupled", or "connected" through an additional component.

Further, with respect to implementation of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

Hereinafter, in the present specification, a cleaning robot includes a robot that performs a cleaning function and optionally provides a function that may be provided by a moving robot such as a guide function or a security function.

FIG. 1 shows a configuration of a cleaning robot according to an embodiment of the present disclosure.

A cleaning robot 100 includes a floor cleaner 110 that separates, from the floor, foreign matters on the floor, a height adjuster 120 that controls a height of the floor cleaner 110, and a driver 130 that moves the cleaning robot 130 at a lower end of the cleaning robot 100. The driver 130 includes moving devices that move the cleaning robot 100, such as wheels and caterpillars.

Further, the cleaning robot 100 includes a central controller 150 that controls the floor cleaner 110, the height adjuster 120, and the driver 130. Further, the cleaning robot 100 includes a map storage 160 (e.g., memory). The map storage 160 stores map information related to a space where the cleaning robot 100 and height information related to a floor of the space. In addition, the cleaning robot 100 includes a sensor 170 that senses materials of the floor or a height of the floor, or electrical changes in the floor cleaner 110 during moving of the cleaning robot 100.

The floor cleaner 110 may be provided in various ways. In an embodiment, the floor cleaner 110 includes an agitator 110a (see FIG. 3) or a side brush. Further, in an embodiment, the floor cleaner 110 rotates based on power received from the motor and removes foreign matters on the floor by separating the foreign maters from the floor.

The floor cleaner 110 may be disposed close to the floor to remove the foreign matters on the floor. For this purpose, the floor cleaner 110 may be disposed close to the floor. Meanwhile, the floor cleaner 110 such as agitators or a side brush may maintain a set height on the floor made of hard materials, such as marble with less friction to perform the cleaning function thereof.

However, load may be generated when the floor cleaner 110 operates on a floor the height of which is increased in the case of material with elasticity or a height thereof changed based on a weight thereof or at a boundary point at which the height of the floor is changed. In one embodiment, in the case of a carpet, wheels of the driver 130 lower the height of the carpet by pressing the carpet. By contrast, the floor cleaner 110 may not press the carpet or press the carpet with a force with a less level than pushing force of the wheel of the driver 130 applied to the carpet, so that the height of the carpet may not be lowered or lowered with a less level. In this case, a distance between the floor cleaner 110 and the carpet is shortened.

Thus, the central controller 150 controls the height adjuster 120 based on the height information of the map storage 160 and the height information sensed by the sensor 170. The height adjuster 120 controls the height of the floor cleaner 110 under the control of the central controller 150.

The height adjuster 120 increases or decreases a distance between the floor cleaner 110 and the floor.

Property information related to the material of the floor on which the cleaning robot is currently disposed is stored in the map storage 160 or materials of the floor are determined based on the information sensed by the sensor 170 to control the height of the floor cleaner 110.

Meanwhile, the cleaning robot 100 optionally includes a communicator 180 and the communicator 180 may notify the information on occurrence of a cleaning situation or an abnormal situation to an external server or through an app of an administrator.

Meanwhile, the cleaning robot 100 may provide various types of cleaning functions as well as a function of the floor cleaner 110 and the cleaning functions may be performed variously according to an implementation method thereof.

Alternatively, the present disclosure may independently include a device only including a central controller 150, a floor cleaner 110, a height adjuster 120, a map storage 160, and a sensor 170. The device may be coupled to a cleaning robot 100 or a robot having various types of functions and purposes other than the cleaning robot 100. The device may be disposed at a lower portion of the robot.

The above configuration is described in detail.

Figure 2:
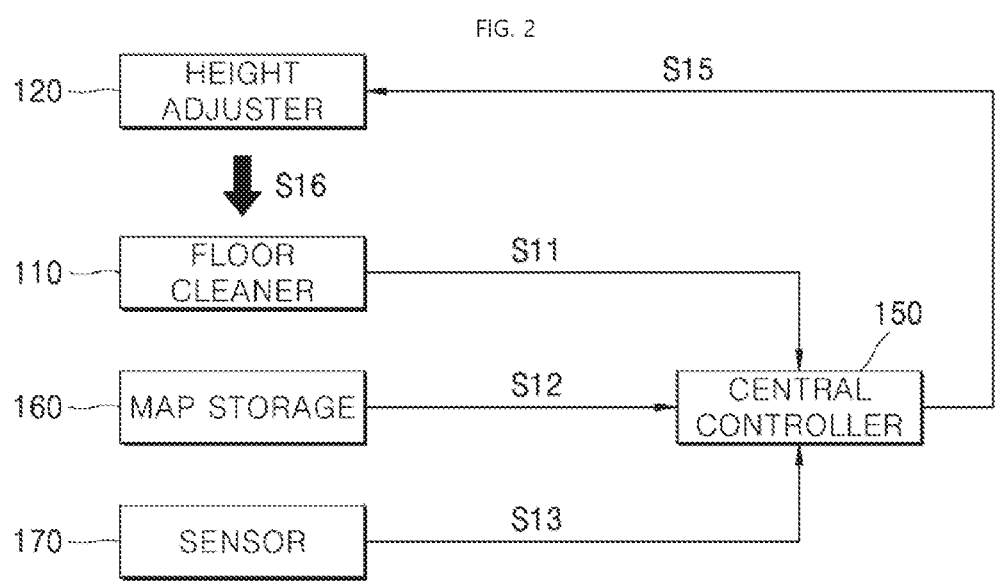
FIG. 2 shows a process of operating components of a cleaning robot according to an embodiment of the present disclosure.

FIG. 2 shows a process of operating components of a cleaning robot according to an embodiment of the present disclosure.

A cleaning robot 100 operates an agitator and a side brush to perform cleaning operation on a marble or other floor, such as a floor of an airport. In this process, an amount of loads applied to a motor that rotates the agitator and the side brush may vary. That is, a floor cleaner 110 notifies, based on the load generated by the motor during cleaning, a central controller 150 of the occurrence of the load (S11). The generation of the load is determined based on an amount of current provided by the motor of the floor cleaner 110. For example, it is determined that the load occurs based on an increased amount of current of the motor.

Alternatively, the map storage 160 may notify, to the central controller 150, that the height of the floor is changed from a current position of the robot (S12). This configuration may be determined based on the increased or reduced height corresponding to the height information related to the floor stored in the map storage 160.

The cleaning robot 100 moves based on map information stored in the map storage 160. The map storage 160 stores properties of the floor material of a space where the cleaning robot moves and provides the height information related to the floor with respect to the current position of the cleaning robot.

The height information related to a general marble floor may be stored as "0" and special physical measurement values (corresponding to the height of the carpet or varying depending on shrinking property of the carpet) corresponding to a height of the carpet may be stored, or height information related to the floor with carpet or the floor without carpet may be stored as numbers of "1" and "2", in the map storage 160.

Alternatively, the sensor 170 may sense that the material of the floor where the cleaning robot moves is changed and may notify, based on the sensed change in the material of the floor, the central controller 150 of the changed material of the floor (S13). A distance between the cleaning robot and an object disposed on the floor in the moving direction may be sensed using a depth camera or an IR sensor.

Distance information sensed by the depth camera or the IR sensor remains constant when the material of the floor is not changed. Meanwhile, the central controller 150 determines that the cleaning robot 100 reaches a point at which material of the floor is changed (a material change point of the floor) based on the sensed distance information being changed according to changed material of the floor, such as the carpet.

The central controller 150 of the cleaning robot 100 controls the height adjuster 120 when the central controller 150 is notified of or identifies changes in the floor during at least one of S11, S12, or S13 (S15). As a result, the height adjuster 120 physically adjusts the height of the floor cleaner 110 (S16) to allow the floor cleaner 110 to operate on the floor with the changed height.

As shown in FIG. 2, based on the cleaning robot 100 operating on the height of the floor adaptively, the motor of the floor cleaner 110 may withstand load on the carpet of the floor during cleaning to thereby prevent malfunction of the floor cleaner 110.

In particular, the central controller 150 may automatically adjust the height of the floor cleaner 110 based on an amount of current of the motor determined based on changes in the floor, height information related to the floor with respect to a current position, and the sensed height of the floor.

The map storage 160 may also store the height information related to the floor or may also store the information on the height of the floor cleaner 110 to be adjusted. Alternatively, the map storage 160 may store changes in an amount of current of the motor of the floor cleaner 110 in case of the height of the floor cleaner 110 being not adjusted. In this case, the central controller 150 may adjust the height of the floor cleaner 110 at an area stored as increase of the amount of current of the motor. To this end, the sensor 170 may include a current sensing sensor.

Further, if the cleaning robot enters an area of the floor having different height, although not registered in the map storage 160, the height of the floor cleaner 110 may be flexibly adjusted during travelling in an area of the floor with increased height using the IR sensor or the depth camera mounted at the lower end of the robot which are detecting cliffs or to determine obstacles disposed on the floor.

As a robot cleaner for home use is not very heavy, when the robot cleaner is disposed on the carpet, all types of devices disposed at the lower end of the robot cleaner have similar heights. Therefore, the load of the motor may not occur in that the agitator disposed at the lower end of the robot cleaner has a raised height.

Meanwhile, according to embodiments of the present disclosure, as the cleaning robot 100 is heavy compared to the robot cleaner, a weight of the cleaning robot 100 is applied through the driver 130 even when the cleaning robot 100 is disposed on the carpet. In this case, as the floor cleaner 110 may clean the floor having the increased height, the load of the floor cleaner 110 is increased in this process.

As shown in FIG. 2, a cleaning performance at the hard floor may be maintained to be identical to a cleaning performance at the floor, for example, the floor with carpet where compression occurs in case of changing the height of the floor cleaner 110 in response to changes in a height of the floor.

Figure 3:
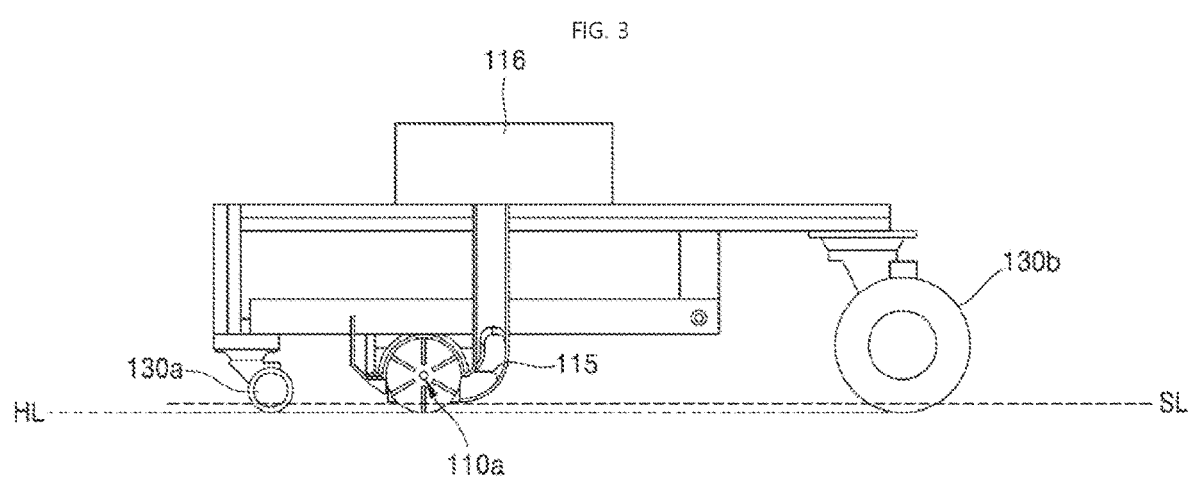
FIG. 3 shows a relative height difference between a floor cleaner 110a and drivers 130a and 130b determined based on materials of the floor according to an embodiment of the present disclosure.

FIG. 3 shows a relative height difference between a floor cleaner 110 and drivers 130a and 130b determined based on materials of a floor according to an embodiment of the present disclosure.

An agitator 110a is disposed as an example of the floor cleaner 110 and foreign materials removed by the agitator 110a, which was disposed on the floor, is stored in a storage 116 through a suctioner 115. Drivers 130a and 130b control movement of a cleaning robot 100.

HL shows a height of a floor made of a hard material. SL shows a height of a carpet disposed on the floor made of hard materials. HL is different from SL and the height of the floor in contact with the drivers 130a and 130b due to a weight of the cleaning robot 100 corresponds to HL.

Meanwhile, a distance between the agitator 110a and the floor varies depending on HL/SL. Enlarged agitator 110a and driver 130a are described below.

Figure 4:
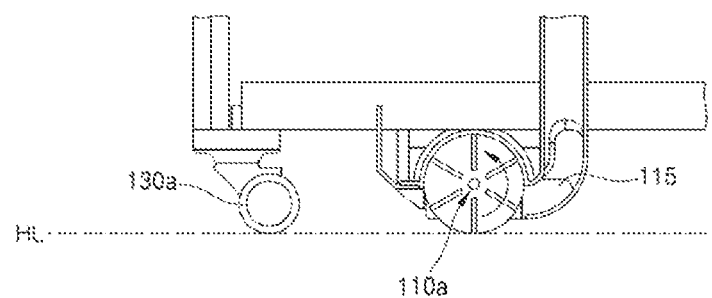
FIG. 4 shows operation of a floor cleaner when a cleaning robot is disposed on a hard floor according to an embodiment of the present disclosure.

FIG. 4 shows operation of a floor cleaner when a cleaning robot is disposed on a hard floor according to an embodiment of the present disclosure.

A height of an agitator 110a from the floor at HL may maintain a sufficient distance from the floor because the floor in contact with the agitator 110a maintains a predetermined height from a driver 130a.

Figure 5A:
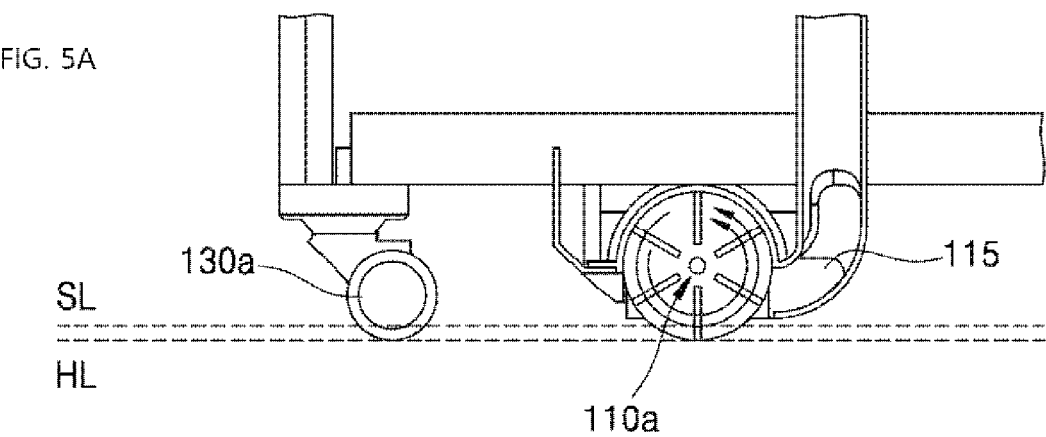
FIGS. 5A and 5B show operation of a floor cleaner when a cleaning robot is disposed on a soft floor according to another embodiment of the present disclosure.
Figure 5B:
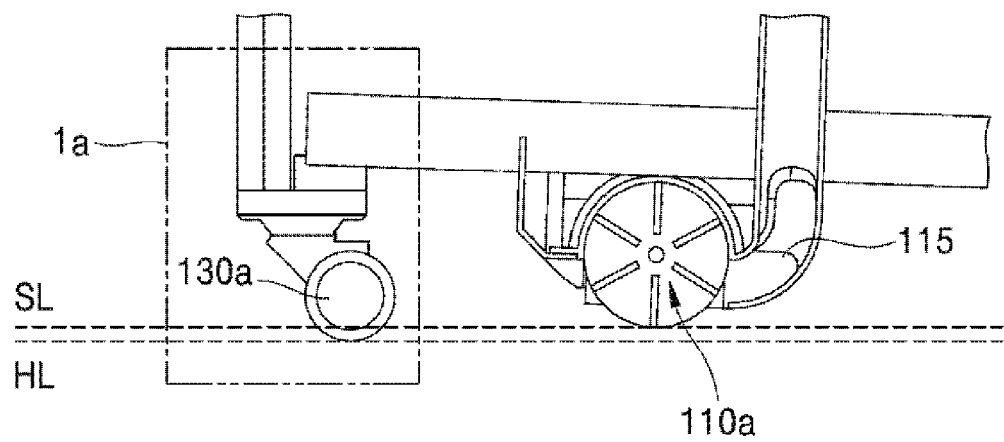

FIGS. 5A and 5B show operation of a floor cleaner when a cleaning robot is disposed on a soft floor according to another embodiment of the present disclosure. FIGS. 5A and 5B show a carpet made of soft material disposed on a hard floor HL, and a top surface of the carpet forms a smooth floor SL.

At this time, the driver 130a of the cleaning robot 100 contacts a hard surface HL under the carpet due to a predetermined weight. This phenomenon occurs by pushing the carpet by the driver 130a of the cleaning robot 100 disposed on the carpet.

Meanwhile, as shown in FIG. 5A, an agitator 110a also contacts a hard floor (HL) rather than an upper surface (SL) of the carpet. Because of this, increase of load of a motor that controls the agitator 110a may be confirmed. This increase is due to friction between the agitator 110a and the upper surface (SL) of the carpet because the agitator 110a presses a hard floor HL corresponding to the lower surface of the carpet rather than the upper surface (SL) of the carpet.

Meanwhile, adjusting a height of a floor cleaner according to an embodiment of the present disclosure is shown in FIG. 5B. A height of an agitator 110a is adjusted by a height adjuster to correspond to a height of the floor surface SL of the carpet. The agitator 110a is adjusted by the height adjuster to have a height corresponding to the floor (SL) of the carpet rather than the floor (HL) in contact with the driver 130a and the agitator 110a may rotate while maintaining a predetermined height from the carpet.

As shown in FIGS. 2 to 5B, the floor cleaner 100 may operate in response to various types of changes in the floor when the height of the floor cleaner 100 is adjusted based on various pieces of sensed or stored information.

The above configuration is particularly useful for cleaning robots designed for large-area cleaning. As the cleaning robot 100 is large in size and heavy in weight, the load that the motor of the floor cleaner 100 may withstand may vary depending on types of the floor as shown in FIGS. 5A and 5B, and damage to the motor may occur if the height of the floor cleaner 100 is not adjusted.

However, according to the embodiment of the present disclosure, the height of the floor cleaner 100 is adjusted to correspond to the height of the floor, thereby reducing the load of the motor and increasing a lifespan of the motor.

If the central controller 150 does not automatically adjust the height of the floor cleaner 100 in consideration of the state of the floor, determining of a state of the floor of a place required for cleaning service may be performed manually and a load applied to the motor may be measured. Manually determining the state of the floor is inefficient during cleaning in a large space.

Therefore, the height of the floor cleaner 100 is automatically adjusted before the cleaning robot enters the area based on the height information related to the floor, which is stored in the map storage 160 to thereby improve efficiency of cleaning and prevent damage to devices. Further, the sensor 170 disposed at a lower end of the cleaning robot may be used when the cleaning robot reaches at an area having different height from a height of the floor corresponding to the height information stored in the map storage 160. When the height of the floor is increased, the sensor 170 adjusts the height of the floor cleaner 100 to prevent the damage to the devices.

Further, the central controller 150 measures and determines the load of the motor of the floor cleaner 100 with respect to changes in the floor, which is confirmed by neither the sensor 170 nor the map storage 160. As a result, the central controller 150 determines that, based on the load of the motor increasing, the height of the floor is to be increased. Further, the central controller 150 may perform the cleaning by adjusting the height of the floor cleaner 110 to thereby protect a motor of the floor cleaner 100 and improve stability of a system.

Figure 6:
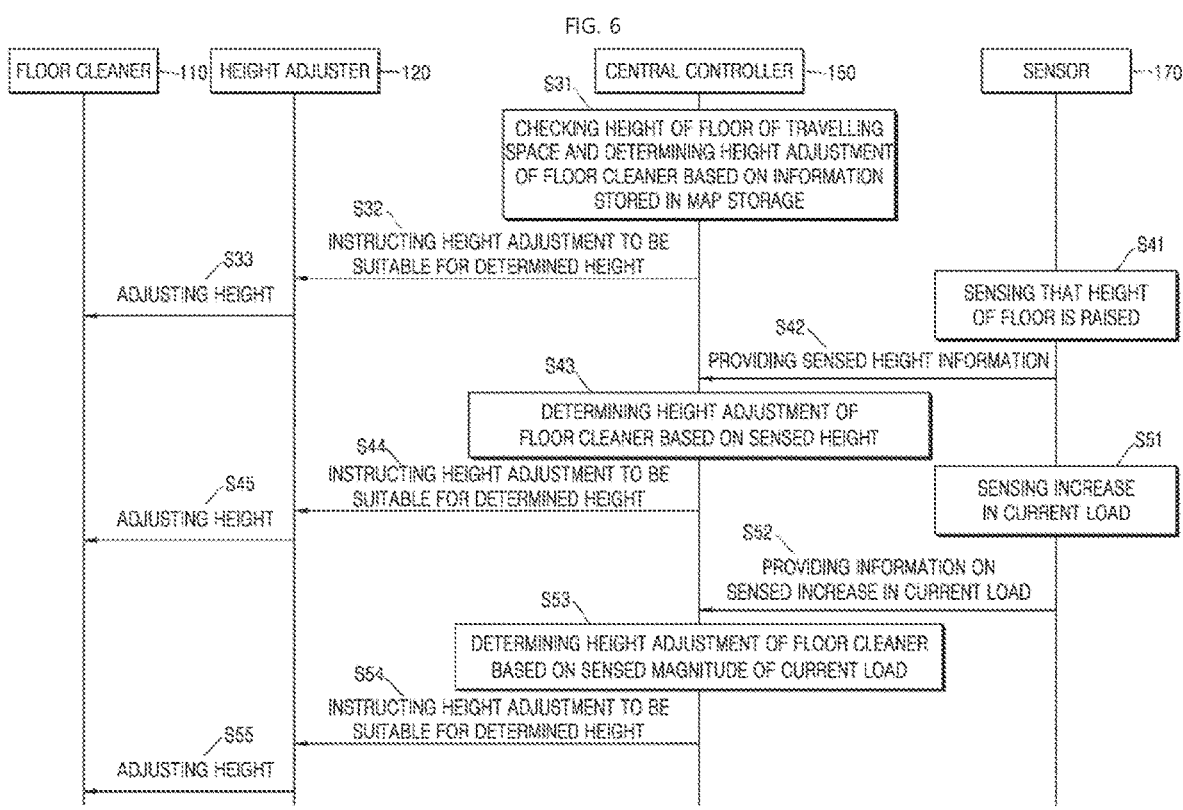
FIG. 6 shows a process of controlling, by a cleaning robot, a height of a floor cleaner according to an embodiment of the present disclosure.

FIG. 6 shows a process of controlling, by a cleaning robot, a height of a floor cleaner according to an embodiment of the present disclosure. A process of adaptively operating, by components of a cleaning robot 100, based on height differences between floors is described.

A central controller 150 of the cleaning robot may control a driver 130 to perform following operation during moving of the cleaning robot.

The central controller 150 checks a floor height of a space including a position at which the cleaning robot 100 travels at present based on information stored in a map storage 160 during movement of the cleaning robot 100. That is, the central controller 150 extracts, from the map storage 160, and identifies the height information related to the floor of the moving space. Subsequently, a series of processes of controlling a height adjuster 120 are performed based on the identified height information related to the floor.

In one embodiment, the central controller 150 determines height adjustment of a floor cleaner 110 based on the identified height information related to the floor (S31). In one embodiment, the height adjustment is performed by setting the height of the floor cleaner 110, as a + value or a − value from a predetermined reference point. Alternatively, in another embodiment, the height adjustment is performed by setting the height as the + value or the − value based on a current height of the floor cleaner 110.

The central controller 150 instructs the height adjustment of the floor cleaner 110 to be suitable for the determined height. This instruction is transmitted to the height adjuster 120 (S32) and the height adjuster 120 performs a predetermined physical function to adjust the height of the floor cleaner 110 (S33). That is, the central controller 150 instructs the height adjuster 120 to adjust the height, for example, the height of the floor cleaner 110 to the determined height.

Meanwhile, in an independent manner with respect to S31 to S33, the sensor 170 continuously senses the height of the floor, including sensing that the height of the floor is raised (or lowered) (S41). The sensor 170 provides, based on the sensor 170 sensing increased height of the floor, the central controller 150 with the sensed height information (S42). In an embodiment, the sensor 170 includes an IR sensor or a depth camera.

The central controller 150 determines the height adjustment of the floor cleaner 110 in response to the sensed height (S43), and the central controller 150 instructs the height adjustment of the floor cleaner 110 to correspond to the determined height. This instruction is transmitted to the height adjuster 120 (S44) and the height adjuster 120 performs a predetermined physical function to adjust the height of the floor cleaner 110 (S45).

In summary of S41 to S45, the sensor 170 senses the height of the floor of the space where the cleaning robot moves or senses the material of the floor where the cleaning robot travels (S41), and the central controller 150 determines the height adjustment of the floor cleaner 110 based on the height information related to the floor sensed by the sensor 170 (S43).

The central controller 150 instructs the height adjustor 120 to adjust the height of the floor cleaner 110 to the determined height.

Further, in an independent manner with respect to S31 to S33 and S41 to S45, the sensor 170 continuously senses load of the current generated by the motor of the floor cleaner 110, including an increase or decrease in load (S51). The sensor 170 provides, based on the sensor 170 sensing increased current load, the central controller 150 with the information on sensed increased current load (S52).

The central controller 150 determines the height adjustment of the floor cleaner 110 based on a sensed magnitude of the current load (S53), and the central controller 150 instructs the floor cleaner 110 to adjust the height to correspond to the determined height. This instruction is transmitted to the height adjuster 120 (S54) and the height adjuster 120 performs the predetermined physical function to adjust the height of the floor cleaner 110 (S55).

In summary S51 to S55, the sensor 170 senses the load of the current applied to the motor of the floor cleaner 110 (S51), the central controller 150 determines the height adjustment of the floor cleaner 110 based on the information on the current load sensed by the sensor 170 (S53). Subsequently, the central controller 150 instructs the height adjuster 120 to adjust the height to adjust the height of the floor cleaner 110 to correspond to the determined height (S54).

The processes of S31 to S33, the processes of S41 to S45, and the processes of S51 to S55 may be performed simultaneously or independently. Alternatively, the processes of S31 to S33, the processes of S41 to S45, and the processes of S51 to S55 may be made sequentially under the control of the central controller 150.

FIG. 6 is summarized as follows. The cleaning robot 100 monitors the height information related to the floor stored in the map storage 160 as exemplified in S31 to S33 and performs cleaning and moving. During cleaning of the cleaning robot 100, a central controller 150 and a height adjuster 120 automatically increases a height of a floor cleaner 110 such as an agitator in a boundary section in which a height of the floor is increased so that climbing is required and lowers the height of the floor cleaner 110 after passing a boundary line to perform cleaning.

Further, when the cleaning robot 100 enters a region where the height of the floor is changed temporarily or after the map generation, although changes in the height is not stored in the map storage 160, the sensor 170 may sense the height of the floor as exemplified in S41 to S45.

The cleaning robot 100 may mount an IR sensor at a bottom of the cleaning robot 100 to detect cliffs or a protrusion at the bottom of the cleaning robot 100. The cleaning robot 100 increases the height of the floor cleaner 110 in a section where the height of the floor being increased, which is sensed by the IR sensor, is generated and stores, in the map storage 160, height information related to the floor with respect to the area. That is, the present disclosure may further include an embodiment in which the height information related to the floor is additionally stored at S43.

Further, in processes of S51 to S55, the height of the floor cleaner 110 may be adjusted in response to an increase of sensed current load when the load of the motor is increased during suctioning of foreign matters by the motor of the floor cleaner 110 based on a power such as rotation.

Further, based on the load of the motor not being decreased even though the height of the floor cleaner 110 is adjusted, a message indicating occurrence of the situation is transmitted to a server or an app of an administrator by performing a communication function (by a communicator) provided by the cleaning robot 100. Further, the cleaning robot 100 may move out of the area to another area.

In this process, the central controller 150 may convert, into height information related to the floor, information on an area where load of the motor is increased, or may generate information indicating the area where changes in the height of the floor occurs to store the information in the map storage 160. For example, storage operation may be performed at S53.

That is, the height of the floor stored in the map storage 160 and the height of the floor sensed by the sensor 170 may be different from each other. Alternatively, even after the height of the floor cleaner 110 is adjusted based on the height information related to the floor stored in the map storage 160, the sensor 170 may sense an increase in load of the current. In this case, the central controller 150 updates the height information related to the floor stored in the map storage 160 based on the information sensed by the sensor 170.

For example, when the sensor 170 is an IR sensor or a depth camera, height information sensed at the position may be updated in the map storage 160.

Alternatively, when the sensor 170 senses the current load, the height information related to the floor cleaner 110 identified at a time point at which the current load is reduced to a general current load based on adjusting the height of the floor cleaner 110, is converted to the height information related to the position to update the height information in the map storage 160.

Further, the robot may generate a movement path thereof to perform cleaning for each area having the same height based on space information stored in the map storage 160 in order to minimize a number of height adjustments of the floor cleaner 110.

Figure 7:
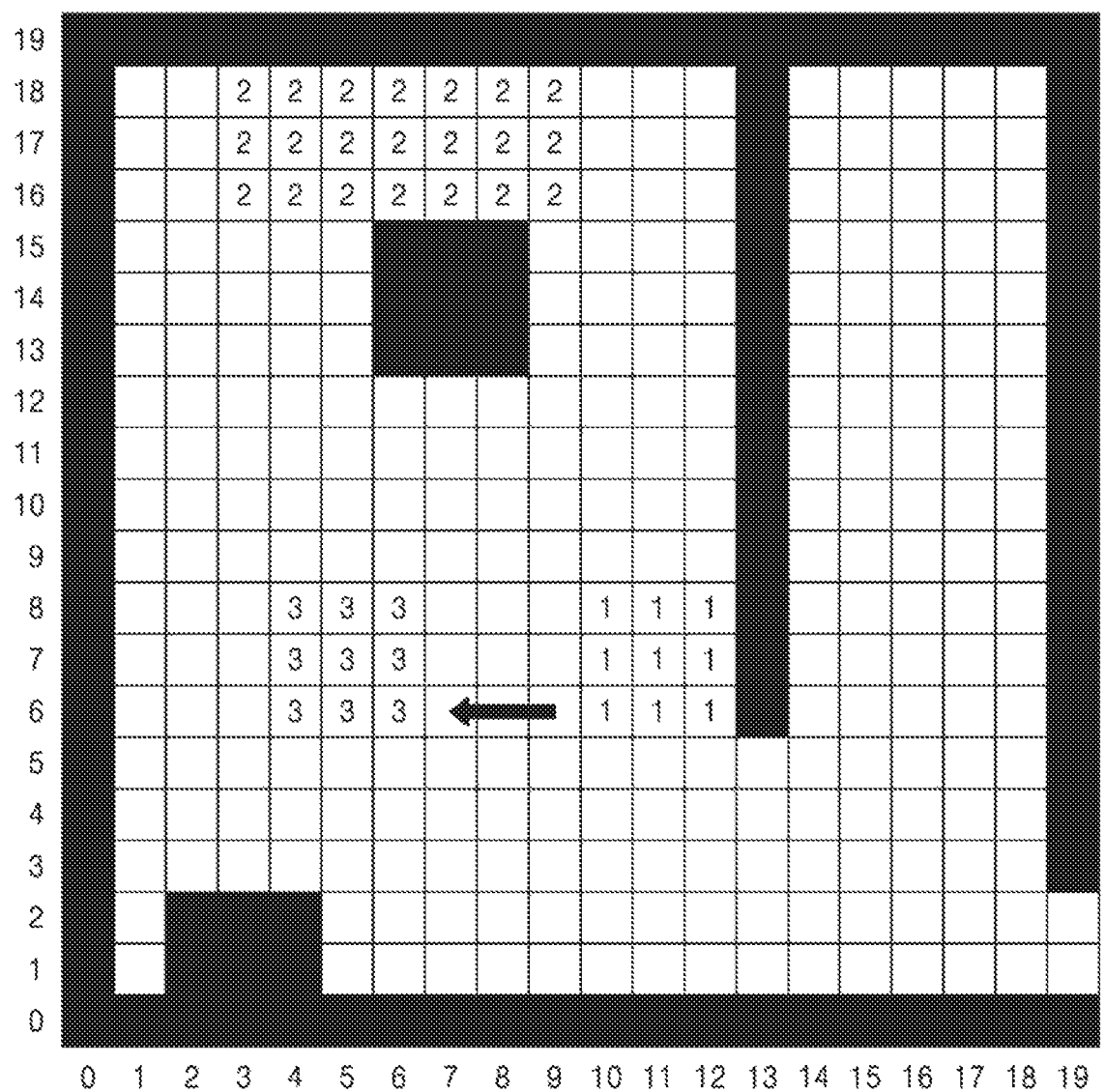
FIG. 7 shows a map stored in a map storage according to an embodiment of the present disclosure.

FIG. 7 shows a map stored in a map storage according to an embodiment of the present disclosure.

A map 160a stored in a map storage 160 essentially stores location information related to fixed objects and may additionally include height information related to the floor. In FIG. 7, a space where a cleaning robot 100 moves is divided into a 20×20 matrix of sub-spaces. Among the sub-spaces, spaces where the cleaning robot 100 may not move, such as walls or columns, are marked with black. Further, a hardest floor was marked with white.

Further, the number refers to height information related to the floor of the space. The height information includes information on height adjustment of a floor cleaner 110. For example, a space indicated by "1" refers that the height information related to the floor is "1," or a space indicated by any number x, such as "2" or "3" (see FIG. 7), refers to the height information related to the floor is that number x. The height information may indicate the height of the carpet and the like or may be information indicating level 1 for height adjustment of the floor cleaner 110.

As the robot is required to adjust the height of the floor cleaner 110 in a space having a different height, height information may be used for generating a movement path of the robot. Therefore, the robot may generate the movement path thereof to move along areas indicated by "1" in the map 160a of FIG. 7. Similarly, areas indicated by "2" or areas indicated by "3" may be set as clustered areas, respectively, and the path may be set to complete the cleaning function within these areas and move to another area.

That is, the central controller 150 generates a movement path of adjacent spaces having the same height information stored in the map storage 160 to maintain the height of the floor cleaner 110 during moving, so that the height of the floor adjuster 110 is not frequently adjusted.

Further, as shown in FIG. 7, as the cleaning robot 100 enters areas having different height of the floor during moving in a direction of an arrow to automatically adjust the height of the floor cleaner 110.

FIG. 8 shows a configuration of a height adjustor according to an embodiment of the present disclosure. A height adjuster 120 may adjust a height of a floor cleaner 110 in various ways. FIG. 8 shows a method of adjusting a height using a motor (cam adjust). Enlarged view of 1a of FIG. 5 is described.

The height adjuster 120 includes a supporter 125, a rotator 121, and a link 122 that adjusts a height of the floor cleaner 110 based on rotation of the rotator 121. Of course, the height adjustor 120 may include different components from components in FIG. 8. For example, based on the height of the floor sensed using a hydraulic cylinder, the height of the floor cleaner 110 may be adjusted accordingly. The present disclosure is not limited to a special mechanical device, and includes various types of adjusting devices capable of adjusting a height of the floor cleaner 110.

Figure 9A:
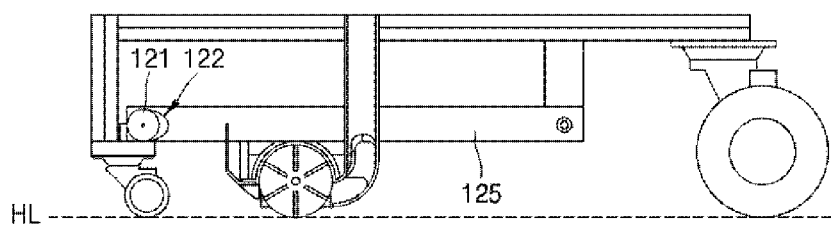
FIGS. 9A-9C show examples of a height of a floor cleaner being adjusted by a height adjustor according to an embodiment of the present disclosure.
Figure 9B:
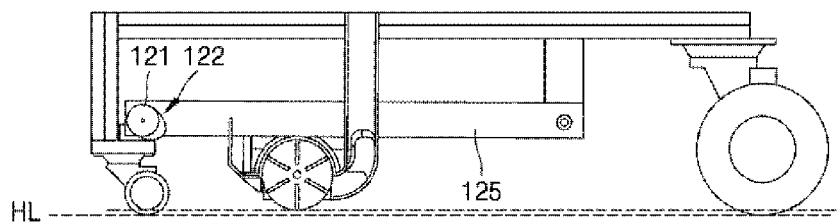
Figure 9C:
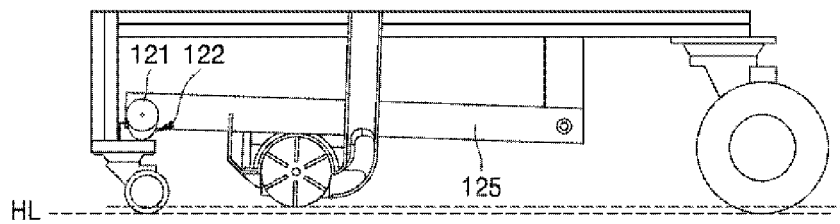

FIGS. 9A-9C show a height of a floor cleaner being adjusted by a height adjustor according to an embodiment of the present disclosure.

In FIG. 9A, a surface in contact with a driver 130 and a surface in contact with a floor cleaner 110 are all the same, i.e., a bottom surface (HL). As a result, the height of the floor cleaner 110 is controlled to be provided at a lowest position. A rotator 121 and a link 122 control a supporter 125 to be in a horizontal arrangement as shown in FIG. 9A.

In FIG. 9B, a surface (HL) in contact with a driver 130 is different from a surface (SL) on which a carpet and the like is disposed. As a result, a height of a floor cleaner 110 is adjusted by a difference between HL and SL. As shown in FIG. 9B, the rotator 121 and the link 122 control the supporter 125 to incline.

In FIG. 9C, a surface (HL) in contact with a driver 130 is different from a surface (SL) on which a carpet and the like is disposed. As a result, a height of a floor cleaner 110 is adjusted by a difference between HL and SL. The difference is greater than the difference between the HL and the SL in FIG. 9B. As shown in FIG. 9C, a rotator 121 and a link 122 are controlled to incline a supporter 125.

FIG. 10 shows a process of updating height information related to floor stored in a map storage according to an embodiment of the present disclosure.

Height information (Hm) related to a floor stored in a map storage 160 is compared with a height Hs of a floor sensed by a sensor 170 (S61). A sensor 170 updates, based on determination that two pieces of information are different from each other, the height information related to the floor stored in the map storage 160 as the height of the floor Hs (S62). In this case, the height information may also be updated whenever difference is generated or may also be updated based on N times or more of determination (N>1) that the difference is generated.

Alternatively, the height information (Hm) related to the floor stored in the map storage 160 and an increase in load of the current sensed by the sensor 170 are compared (S63). Based on the load increasing beyond a general current load reference, it is updated by increasing the height information Hm in proportion to an increase in the load of the current (S64). For example, based on the load of the current being increased when 3 cm of the height information (Hm) is stored in the map storage 160, the height information (Hm) is increased from 3 cm to 4 cm by a predetermined size.

The map storage 160 may store an increase rate of the height thereof in response to an amount of increase in current. For example, based on an amount of increase in current being 30%, the height increase ratio may be 30%. Alternatively, the height may be increased by 1 cm based on an amount of increase in the current being 30%. This configuration may be variously selected depending on properties of the configuration of the cleaning robot or the floor cleaner.

The update is performed by updating a stored value of the map storage 160 under the control of the central controller 150.

FIG. 11 shows a process of transmitting, to outside, a state of a floor cleaner sensed by a sensor according to an embodiment of the present disclosure.

A sensor 170 senses a state of a floor cleaner (S71). A communicator 180 transmits, based on an increase in the current load accumulated during this process, the sensed information of the floor cleaner 110 to an external server or a mobile terminal of or an administrator (S72). The external server or the mobile terminal includes various types of controlling devices that remotely control or monitor the cleaning robot.

Subsequently, a communicator 180 receives a control message from an external server or a mobile terminal and transmits the control message to a central controller 150 (S73). In one embodiment, the control message includes instructing the cleaning to be stopped or collectively raising a height of a floor cleaner 110, or instructing the cleaning robot to return to a home station.

The central controller 150 controls the cleaning robot based on the received control message (S74).

Based on the height of a cleaner being not adjusted according to types of floor, the cleaning robot may not operate easily in a large space including the floor made of various types of materials and having different heights and load may be applied to components of the robot when the cleaning robot is operated based on assumption that the height is a uniform height.

Meanwhile, when embodiments of the present disclosure are applied, the cleaning robot may be adaptively operated based on various types of materials and various heights of the floor without setting and changing a cleaner of the cleaning robot regardless of types of floor of a place where the cleaning is performed. As a result, man power or controlling devices that may be additionally provided for the cleaning robot may not be required and an efficiency of the cleaning robot may be improved by autonomous cleaning.

Further, the height of the floor cleaner 110 is adjusted on the carpet to reduce the load of the motor of the floor cleaner 110 and increase a lifespan of the motor, thereby increasing toughness of the components of the cleaning robot.

Further, the communicator 180 transmits information on the state of the motor sensed by the sensor 170 to an application installed in external server or a mobile terminal of the administrator to facilitate maintenance and take action quickly if problems occurs to perform effective cleaning service.

Although components included in the exemplary embodiment of the present disclosure are described as being combined to one, or as being coupled to operate, such exemplary embodiment is not necessarily limited to this specific example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The storage medium of the computer program may include a storage medium including a semiconductor recording element, an optical recording medium, a magnetic recording medium. Further, the computer program that implements embodiments of the present disclosure may include a program module that is transmitted in real time through an external apparatus.

While the present disclosure has been mainly described referring to the exemplary embodiments of the present disclosure hereinabove, various modifications and changes can be made at the level of those skilled in the art. Therefore, unless such a modification and change do not deviate from the range of the present disclosure, it will understand that they are included in the scope of the present disclosure.

The invention claimed is:

1. A cleaning robot, comprising:
   a driver configured to move the cleaning robot on a floor;
   a floor cleaner configured to separate foreign material from the floor;
   a height adjuster configured to control a height of the floor cleaner;
   a map storage configured to store height information of the floor, the floor being located within a space where the cleaning robot moves;
   a sensor configured to sense the height of the floor in the space; and
   a central controller configured to control the height adjuster based on a height of the floor provided in the height information stored in the map storage and the height of the floor sensed by the sensor,
   wherein the central controller is further configured to:
      generate a movement path of the cleaning robot to move to adjacent areas within the space having same heights based on the height information stored in the map storage to minimize a number of height adjustments of the floor cleaner, and
      control the driver to move the cleaning robot based on the generated movement path.

2. The cleaning robot of claim 1, wherein the central controller is further configured to:
   determine a height adjustment of the floor cleaner based on the height information of the floor in a current location of the cleaning robot, and
   control the height adjuster to adjust the height of the floor cleaner based on the determined height adjustment.

3. The cleaning robot of claim 1, wherein the sensor is configured to sense a material of the floor within the space, and
   wherein the central controller is further configured to:
      determine a height adjustment of the floor cleaner based on the height of the floor sensed by the sensor, and
      control the height adjuster to adjust the height of the floor cleaner based on the determined height adjustment.

4. The cleaning robot of claim 1, wherein the floor cleaner includes a motor,
   wherein the sensor is configured to sense a load of the motor based on a current applied to the motor, and
   wherein the central controller is further configured to:
      determine a height adjustment of the floor cleaner based on the load of the motor sensed by the sensor, and
      control the height adjuster to adjust the height of the floor cleaner based on the determined height adjustment.

5. The cleaning robot of claim 3, wherein the floor cleaner includes a motor,
   wherein the sensor is configured to sense a load of the motor based on a current applied to the motor, and
   wherein the central controller is further configured to, when a height of the floor corresponding to the height information of the floor stored in the map storage is different from the height of the floor sensed by the sensor, or when the sensor senses an increase in the load of the motor after the height of the floor cleaner is adjusted based on the height information of the floor stored in the map storage, update the height information of the floor stored in the map storage based on the height of the floor sensed by the sensor.

6. The cleaning robot of claim 4, wherein the floor cleaner includes a motor,
   wherein the sensor is configured to sense a load of the motor based on a current applied to the motor, and
   wherein the central controller is further configured to, when a height of the floor corresponding to the height information of the floor stored in the map storage is different from the height of the floor sensed by the sensor, or when the sensor senses an increase in the load of the motor after the height of the floor cleaner is adjusted based on the height information of the floor stored in the map storage, update the height information of the floor stored in the map storage based on the height of the floor sensed by the sensor.

7. An apparatus, comprising:
   a floor cleaner disposed at a lower portion of the apparatus to separate, from a floor, foreign material on the floor;
   a height adjuster connected to the floor cleaner and configured to control a height of the floor cleaner;
   a map storage configured to store height information of the floor, the floor being located within a space where the apparatus moves;
   a sensor configured to sense a height of a floor in the space; and
   a central controller configured to control the height adjuster based on the height information stored in the map storage and the height of the floor sensed by the sensor,
   wherein the central controller is further configured to:

generate a movement path of the apparatus to move to adjacent areas within the space having same heights based on the height information stored in the map storage to minimize a number of height adjustments of the apparatus, and control the apparatus to move based on the generated movement path.

8. The apparatus of claim 7, wherein the central controller is further configured to:

determine a height adjustment of the floor cleaner based on the height information of the floor in a current location of the apparatus, and control the height adjuster to adjust the height of the floor cleaner based on the determined height adjustment.

9. The apparatus of claim 7, wherein the sensor is configured to sense a material of the floor within the space, and wherein the central controller is further configured to:

determine a height adjustment of the floor cleaner based on the height of the floor sensed by the sensor, and control the height adjuster to adjust the height of the floor cleaner based on the determined height adjustment.

10. The apparatus of claim 7, wherein the floor cleaner includes a motor, wherein the sensor is configured to sense a load of the motor based on a current applied to the motor, and wherein the central controller is further configured to:

determine the height adjustment of the floor cleaner based on the load of the motor sensed by the sensor, and control the height adjuster to adjust the height of the floor cleaner based on the determined height adjustment.

11. A method for adaptively operating a cleaning robot, the cleaning robot including:

a driver for moving the cleaning robot on a floor;

a floor cleaner for separating foreign material from the floor;

a height adjuster for controlling a height of the floor cleaner;

a map storage storing height information of the floor, the floor being located within a space where the cleaning robot moves;

a sensor for sensing a height of the floor; and a central controller for controlling the height adjuster, the driver and the floor cleaner, the method comprising:

moving the cleaning robot by controlling the driver by the central controller;

extracting, by the central controller, the height information of the floor from the map storage;

controlling, by the central controller, the height adjuster based on the height information of the floor; and adjusting, by the height adjuster, the height of the floor cleaner, wherein the floor cleaner includes a motor, and wherein the method further comprises:

sensing, by the sensor, a load of the motor based on a current applied to the motor; and updating, by the central controller, when a height of the floor corresponding to the height information of the floor stored in the map storage is different from the height of the floor sensed by the sensor, or when the sensor senses an increase in the load of the motor after the height of the floor cleaner is adjusted based on the height information of to the floor stored in the map storage, the height information of the floor stored in the map storage based on the height sensed by the sensor.

12. The method of claim 11, further comprising:

sensing, by the sensor, the height of the floor; and controlling, by the central controller, the height adjuster based on the height information of the map storage and based on the height of the floor sensed by the sensor.

13. The method of claim 11, further comprising:

determining, by the central controller, a height adjustment of the floor cleaner based on the height information of the floor in a current location of the cleaning robot; and controlling, by the central controller, the height adjuster to adjust the height of the floor cleaner based on the determined height adjustment.

14. The method of claim 11, further comprising:

sensing, by the sensor, a material of the floor within the space;

determining, by the central controller, a height adjustment of the floor cleaner based on the material of the floor sensed by the sensor; and instructing, by the central controller, the height adjuster to adjust the height of the floor cleaner based on the determined height adjustment.

15. The method of claim 11, wherein the method further comprises:

determining, by the central controller, a height adjustment of the floor cleaner based on the load of the motor sensed by the sensor; and controlling, by the central controller, the height adjuster to adjust the height of the floor cleaner based on the determined height adjustment.

16. The method of claim 11, further comprising:

generating, by the central controller, a movement path of the cleaning robot to move to adjacent areas within the space having same heights based on the height information stored in the map storage to minimize a number of height adjustments of the floor cleaner; and controlling the driver to move the cleaning robot based on the generated movement path.

* * * * *